Patented Feb. 23, 1932

1,846,771

UNITED STATES PATENT OFFICE

CONWAY, BARON von GIRSEWALD AND HANS WEIDMANN, OF FRANFORT-ON-THE-MAIN, GERMANY

METHOD FOR WORKING UP ROASTED PYRITES CONTAINING COPPER AND ZINC

No Drawing. Application filed July 22, 1931, Serial No. 552,538, and in Germany August 31, 1928.

The invention relates to a method for working up roasted pyrites containing copper and zinc which have been subjected to chloridizing roasting, by treating the roasted material with leaching liquids.

It is already known that by fractional treatment of such material with leaching liquid as, for instance, pure water or slightly acidified water from the wash towers for the exhaust gas of the roasting furnaces, it is possible to obtain the greater part of the leachable zinc in the first liquor fraction and the greater part of the leachable copper in the second liquor fraction. The leaching is accomplished in the ordinary way by the so-called "trickling leaching", in which the roasted material is placed in a layer of about 1.5 meters in height on a grate-like support in large receptacles with inclined floors and an outlet opening at the lowest part of the floor, and is then covered with the leaching liquid. The liquor flowing down is collected in fractions, whereupon each of the separate liquor fractions is worked up by itself.

This working-up and recovery of the zinc, on the one hand, and the copper, on the other hand, from the liquor fractions obtained in this way is accomplished the more simply and satisfactorily the less the content of copper in the zinc fraction and the content of zinc in the copper fraction. The invention depends on the discovery that an exceedingly thorough separation of these constituents can be produced by the fractional leaching if the leaching operation is carried out at such low temperatures that the temperature of the first liquor fraction flowing off, measured at the outlet, at the maximum does not greatly exceed 50° C., and if for this purpose the roasted material coming from the furnace is subjected before the leaching to a cooling sufficiently thorough that its temperature is less than 80° C. and preferably not more than about 70° C. after it is charged into the leaching vat and before the addition of the leaching liquor.

At present the roasted material coming from the furnace is generally subjected to the following treatment before leaching: The still highly heated material spread out in thin layers on a movable surface, for instance on a rotary plate, is uniformly sprayed with an aqueous liquid in such an amount that the roasted material is not apparently moistened (U. S. Patent 1,235,598). By operating in this way certain of the disadvantages involved in the direct contact of the highly heated roasted material with the leaching liquid are avoided. The disadvantages thus avoided are the bothersome and disagreeable development of vapor and dust in the leaching vat and the formation of clumps in the roasted material, causing irregular leaching and excessive consumption of the leaching liquid.

By this method the cooling of the hot roasted material takes place by the vaporization of the water supplied as long as the temperature of the material still exceeds 100° C. From this point downward, however, a further considerable cooling of the material according to this process, by direct supply of water, is no longer feasible, since the material cannot take up more than 8–12% water at the most, without conversion to a pasty condition. Such a thorough soaking of the material would, however, involve considerable difficulties in the handling of the material which would form a fluid or sloppy paste.

Such a thorough cooling of the roasted material as is necessary for producing a leaching temperature not exceeding 50°–70° C., desired in the invention, and a corresponding thorough separation of the zinc from the copper in the subsequent fractional leaching, cannot be attained by the treatment of the material according to the above described process; if the supply of liquid were increased over the amount that the material can take up without becoming soppy, a leaching of the material would occur at temperatures the avoidance of which is exactly the purpose of the present invention, in addition to the above-mentioned disadvantages.

A sufficient cooling effect is on the contrary produced according to the invention by subjecting the material coming from the furnace or precooled by the known method by direct spraying with water, to a further cooling with avoidance of direct supply of liquid, preferably a direct cooling by circulated air. Indirect cooling with cooling liquid can also be used for this purpose; for instance, the material can be sent through pipes or shaking conveyors externally cooled by water. In certain cases two or more of these cooling processes can be used simultaneously or successively.

For the leaching, besides water, use can be made for instance of the acidulous liquid obtained in the washing of the acid exhaust gases of the roasting process. It has been found advisable to cool the leaching liquid before the action on the roasted material.

In order to avoid the harmful separation of Glaubers salt in the roasted material during the leaching operation, it is generally advisable not to carry the cooling of the roasted material and/or of the cooling liquid so far that the temperature of the mixture of roasted material and liquor goes below 32.4° C. during the leaching.

By working in the way described it is possible to carry the separation of the zinc from copper so far even in the fractional leaching that in leaching roasted pyrites having a normal average content of about 1–3% Zn and 1–3% Cu with the usual total volume of liquid of 1 cubic meter to 1 ton of the roasted material, the first liquor fraction, preferably amounting to about 20–30% of the whole amount of liquor, contains about 90% and over of the leachable zinc and only about 15% or a little more of the leachable copper, so that the ratio Zn : Cu in the solution amounts to about 6 : 1 to 5 : 1. According to the process heretofore known, it is possible to obtain at the most only about 90% of the leachable zinc with about 35% of the leachable copper, in the first fraction, corresponding to a ratio of Zn : Cu of only 2.6 : 1.

The exceptional advantage produced by the process of the invention resides not only in the increase in zinc output in the first liquor fraction, but above all in the fact that with the decrease in the amount of copper going over in the zinc fraction, the separation of the copper from the zinc and the separation of the zinc in pure form is facilitated.

By "temperature of the first liquor fraction flowing off from the liquor vat" in the description and the claims is meant the greatest temperature attained by the first liquor fraction, measured directly at the outlet during the flowing off, when after overcoming an original cooling off by cold parts, especially the cold bottom, of the liquor vat the temperature of the liquor flowing out has reached its maximum.

By "temperature of the roasted material" in the description and in the claims is to be understood the average temperature of the different layers of the roasted material directly after introduction of the whole material in the liquor vat measured in the middle of the liquor vat and before the addition of the leaching liquid.

The great advantages obtained by the invention may be illustrated by the following examples:

1. 90,000 kg. of roasted pyrite cinders containing 2% of zinc, 2% of copper and 9% of humidity were cooled so that the temperature of the roasted material in the leaching vat prior to the application of the leaching liquor did not exceed 50° C. The maximum temperature of the first liquor fraction (25 cubic meters), measured at the outflow, was 45° C. This first fraction contained more than 90% of the leachable zinc and only 15% of the leachable copper. The ratio between zinc and copper was therefore 6 : 1 in this fraction.

2. In another experiment made for comparing the new method with the ordinary methods the same amount of the same cinders was leached in the same manner as in example 1, except that the temperature of the roasted pyrite in the leaching vat prior to introduction of the leaching solution was 85° C. The maximum temperature of the first liquor fraction, measured at the outflow, was 75° C. This first fraction (25 cubic meters) contained more than 90% of the leachable zinc, but 45% of the leachable copper. The ratio between zinc and copper was therefore 2 : 1.

The two comparative tests show the great advantages obtained by operating according to the invention. They show, however, also that even temperatures of the leaching solution not much above 50° lead to far greater amounts of copper in the first fraction.

The different fractions of the leaching solution may be worked up according to usual methods. Thus, for example, the first fraction, called the zinc-fraction, is treated with iron, or, for example, zinc oxide, in order to remove the copper by cementation or precipitation. Then the Glaubers salt present in the zinc fraction is removed, for example by freezing, and from the remaining solution the zinc is precipitated, for example by treatment with milk of lime. In case the copper has been removed by cementation with iron, it is of advantage to remove the small amounts of iron which went into solution, according to usual methods, before precipitating the zinc.

The copper in the second fraction of the leaching solution may be recovered in known manner, for example by cementation with iron.

This application is a continuation-in-part of application Serial No. 317,473, filed Nov. 5, 1928.

We claim:

1. A method for working up copper- and zinc-containing roasted pyrites which have been subjected to chloridizing roasting, which comprises fractionally leaching the roasted material after it has been cooled to such a temperature that the first leaching fraction has when flowing off a temperature not substantially above 50° C., whereby the first leaching fraction contains substantially all of the zinc contained in the roasted material, and the subsequent fraction contains substantially all of the copper contained in the roasted material.

2. A method for working up copper- and zinc-containing roasted pyrites which have been subjected to chloridizing roasting, which comprises fractionally leaching the roasted material after it has been cooled to such a temperature that the first leaching fraction has when flowing off a temperature below 50° C., whereby the first leaching fraction contains substantially all of the zinc contained in the roasted material, and the subsequent fraction contains substantially all of the copper contained in the roasted material.

3. A method for working up copper- and zinc-containing roasted pyrites which have been subjected to chloridizing roasting, which comprises fractionally leaching the roasted material after it has been cooled at least partly without direct contact with the leaching liquor to such a temperature that the first leaching fraction has when flowing off a temperature not substantially above 50° C., whereby the first leaching fraction contains substantially all of the zinc contained in the roasted material, and the subsequent fraction contains substantially all of the copper contained in the roasted material.

4. A method for working up copper- and zinc-containing roasted pyrites which have been subjected to chloridizing roasting, which comprises fractionally leaching the roasted material after it has been cooled at least partly without direct contact with the leaching liquor to such a temperature that the first leaching fraction has when flowing off a temperature not substantially above 50° C., the first leaching being carried out with cooled liquor, whereby the first leaching fraction contains substantially all of the zinc contained in the roasted material, and the subsequent fraction contains substantially all of the copper contained in the roasted material.

5. A method for working up copper- and zinc-containing roasted pyrites which have been subjected to chloridizing roasting which comprises fractionally leaching the roasted material after it has been cooled without direct contact with the leaching liquor from a temperature of about 100° C. down to such a temperature that the first leaching fraction has when flowing off a temperature not substantially above 50° C., whereby the first leaching fraction contains substantially all of the zinc contained in the roasted material, and the subsequent fraction contains substantially all of the copper contained in the roasted material.

6. Process of working up roasted pyrites containing copper and zinc which have been subjected to chloridizing roasting, which comprises cooling the roasted material after leaving the furnace, to such an extent that its temperature, measured as an average of the different layers in the middle of the leaching vat, is less than 80° C., and thereafter subjecting the material to fractional leaching, whereby the first leaching fraction contains substantially all of the zinc contained in the roasted material, and the subsequent fraction contains substantially all of the copper contained in the roasted material.

7. Process of working up roasted pyrites containing copper and zinc which have been subjected to chloridizing roasting, which comprises cooling the roasted material after leaving the furnace, at least partly without direct contact with cooling liquid, to such an extent that its temperature measured as an average of the different layers in the middle of the leaching vat, is less than 80° C., and thereafter subjecting the material to fractional leaching, whereby the first leaching fraction contains substantially all of the zinc contained in the roasted material, and the subsequent fraction contains substantially all of the copper contained in the roasted material.

8. Process of working up roasted pyrites containing copper and zinc which have been subjected to chloridizing roasting, which comprises first precooling the roasted material after leaving the furnace, by spraying with an amount of leaching liquid insufficient to completely soak the material, then further cooling the material without direct contact with cooling liquid to such an extent that its temperature, measured as an average of the different layers in the middle of the leaching vat, is less than 80° C., and thereafter subjecting the material to fractional leaching, whereby the first leaching fraction contains substantially all of the zinc contained in the roasted material, and the subsequent fraction contains substantially all of the copper contained in the roasted material.

9. Process of working up roasted pyrites containing copper and zinc which have been subjected to chloridizing roasting, which comprises cooling the roasted material after leaving the furnace, at least partly by the circulation of air in contact therewith and without direct contact with liquid, to such an extent that its temperature, measured as an average of the different layers in the middle of the leaching vat, is less than 80° C., and thereafter subjecting the material to fractional leaching, whereby the first leaching fraction contains substantially all of the zinc contained in the roasted material, and the subsequent fraction contains substantially all of the copper contained in the roasted material.

In testimony whereof, we affix our signatures.

CONWAY, BARON von GIRSEWALD.
HANS WEIDMANN.